(12) United States Patent
Chang et al.

(10) Patent No.: US 6,236,096 B1
(45) Date of Patent: May 22, 2001

(54) STRUCTURE OF A THREE-ELECTRODE CAPACITIVE PRESSURE SENSOR

(75) Inventors: Kow-Ming Chang; Gwo-Jen Hwang; Yeou-Lang Hsieh, all of Hsinchu (TW)

(73) Assignee: National Science Council of Republic of China, Taipei (TW)

( * ) Notice: Subject to any disclaimer, the term of this patent is extended or adjusted under 35 U.S.C. 154(b) by 0 days.

(21) Appl. No.: 09/660,357

(22) Filed: Sep. 12, 2000

Related U.S. Application Data

(62) Division of application No. 09/166,791, filed on Oct. 6, 1998, now abandoned.

(51) Int. Cl.$^7$ .................................................. H01L 21/36
(52) U.S. Cl. ...................... 257/419; 257/414; 257/415; 257/416; 257/417; 438/50; 438/51; 438/53; 73/24
(58) Field of Search .................................. 257/414, 415, 257/416, 417, 418, 419, 300–306; 438/50, 51, 52, 53

(56) References Cited

U.S. PATENT DOCUMENTS

| | | |
|---|---|---|
| 5,503,285 | 4/1996 | Warren . |
| 5,528,452 | 6/1996 | Ko . |
| 5,543,349 | 8/1996 | Kurtz et al. . |
| 5,792,957 * | 8/1998 | Luder et al. ............................ 73/724 |
| 5,912,499 * | 6/1999 | Diem ................................... 257/429 |
| 6,036,872 | 3/2000 | Wood et al. . |

* cited by examiner

*Primary Examiner*—David Nelms
*Assistant Examiner*—Dung A Le
(74) *Attorney, Agent, or Firm*—Bacon & Thomas

(57) ABSTRACT

A structure and producing method of a three-electrode capacitive pressure sensor can integrate and produce sensor capacitor and reference capacitor in the same pressure sensor cavity. This dual capacitor integration structure can cancel off environment interference of the same mode by differentiated circuit. Avoiding connection between upper and lower electrode plates can be achieved through the existence of a third electrode plate. In working pressure interval from 25 psi to 40 psi, the sensitivity of said three-electrode capacitive sensor is a 0.21 pF/psi, while the sensitivity of an ordinary planar connection pressure sensor is 0.05 pF/psi. The merits of said three-electrode capacitive pressure sensor include trivial production procedure and connection with planar and high sensitivity.

2 Claims, 7 Drawing Sheets

STRUCTURE OF A THREE-ELECTRODE CAPACITIVE PRESSURE SENSOR

This application is a division of Ser. No. 09/166,791 filed Oct. 6, 1998, now abandoned.

BACKGROUND OF THE INVENTION

This invention is a capacitive pressure sensor. It is a three-electrode capacitive pressure sensor with structure and producing method for of especially integrating and producing both sensor capacitor and reference capacitor into the same pressure sensor cavity for eliminating environment interference of the same mode.

Two parallel electrode plates compose general capacitive pressure sensor. In micro sensor, these two electrode plates generally are a silicon film and a metal film on glass insulation material. Therefore, a dimensional connection of the two upper and lower electrode plates is usually seen in the producing procedure of capacitive pressure sensor. This procedure requires contact base of the two upper and lower electrode plates with optical masking that increases more producing procedure and causes cost enhancement.

For avoiding dimensional connection of upper and lower electrode plates for a single capacitor, one electrode plate can be separated into two parts and then form a planar connection by series of capacitors through another electrode plate. However, this method will reduce its pressure sensitivity because the original capacitor is divided into two smaller capacitors, which then are connected by series method.

The capacitor pressure sensor composed by the dual capacitors, one is sensor capacitor and the other is reference capacitor, can cancel off environment change under same mode through differentiated measurement. Such capacitive structure and design can enlarge at least one time more in sizes in comparison with that of single capacitive. Besides, an additional connection shall be made between electrode plates of such dual capacitors.

SUMMARY OF THE INVENTION

In order to solve these difficulties, a three-electrode capacitive pressure sensor structure and producing method with only a four-course optical masking is therefore developed which can integrate and produce dual capacitors into a pressure sensor cavity without increasing sensor size and complete dual capacitors requirement of differentiated measurement circuitry. Meanwhile, existence of the third electrode not only achieves planar connection production but also enhance its pressure sensitivity.

BRIEF DESCRIPTION OF THE DRAWINGS

The drawings disclose an illustrative embodiment of the present invention which serves to exemplify the various advantages and objects hereof, and are as follows:

Drawing 1: Structure & Producing Structure Drawing of the invention (a three-electrode capacitive pressure sensor)

Figure 1A:
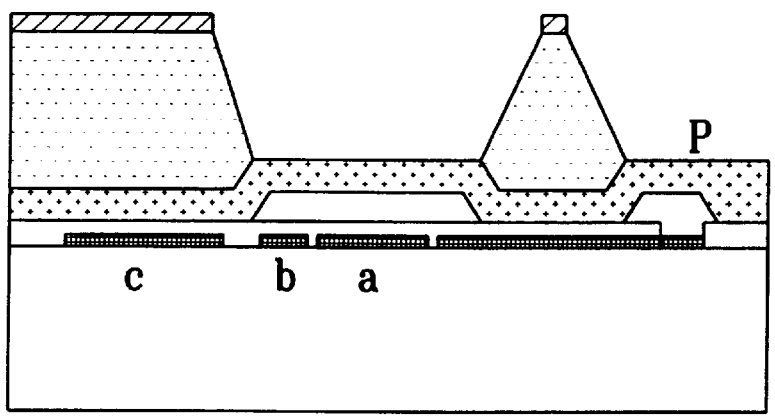
Figure 1B:
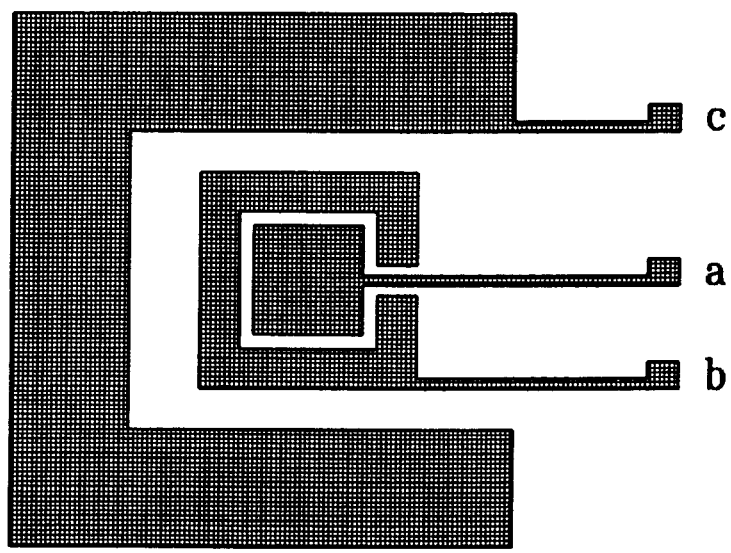
Figure 2:
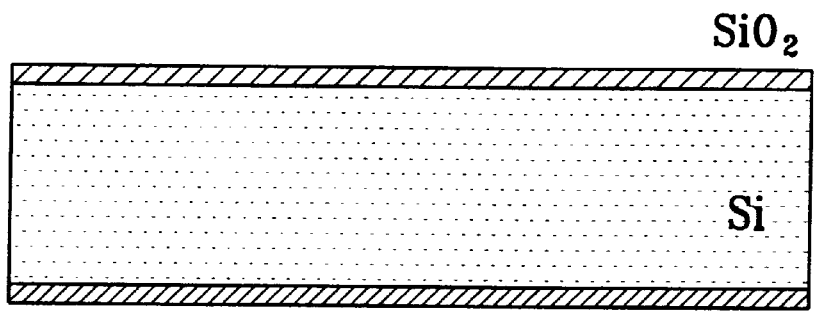
Figure 3:
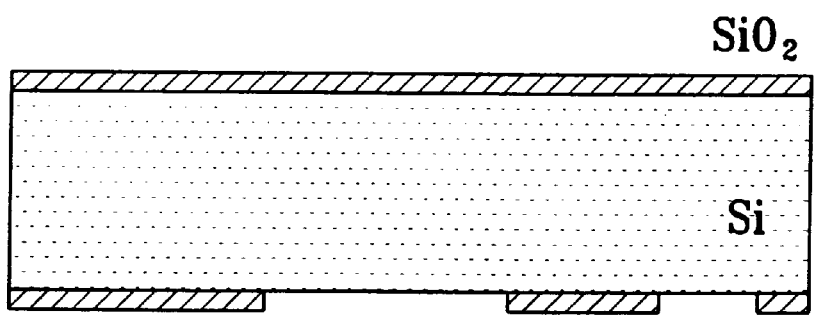
Figure 4:
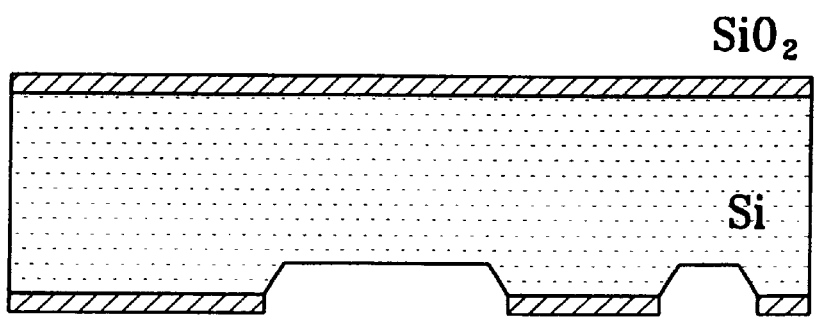
Figure 5:
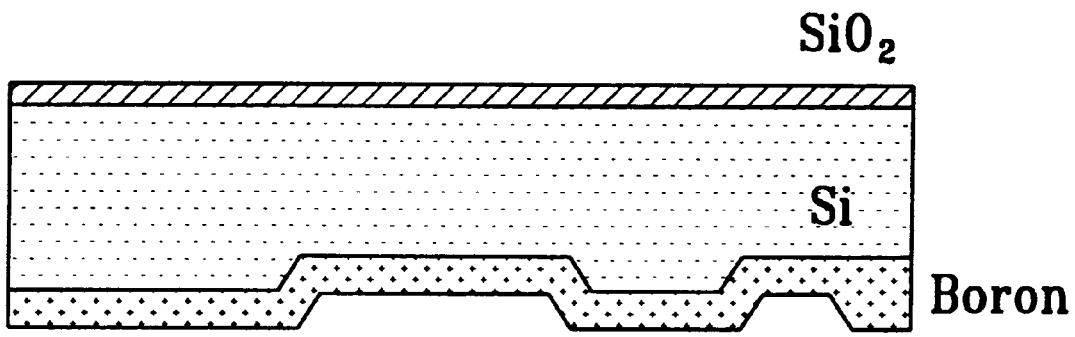
Figure 6:
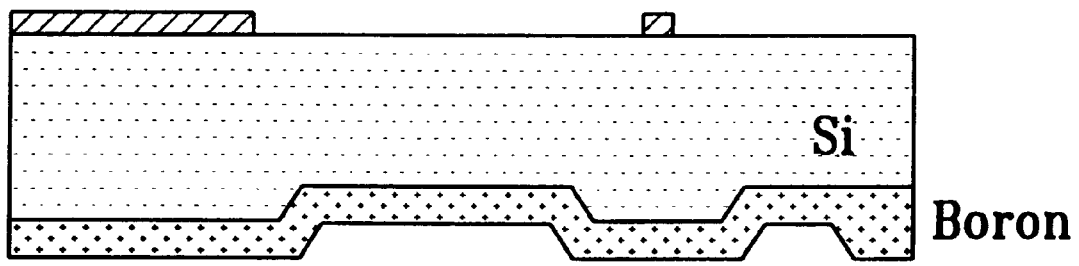
Figure 7:
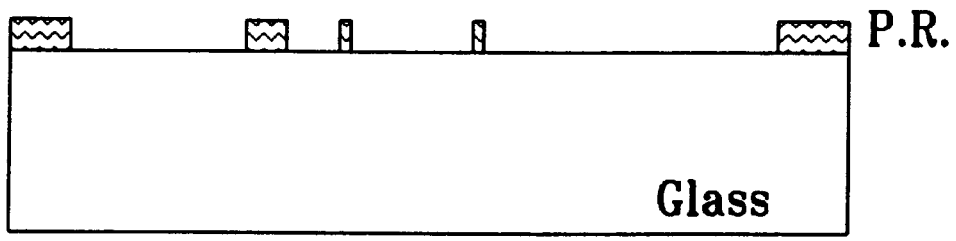
Figure 8:
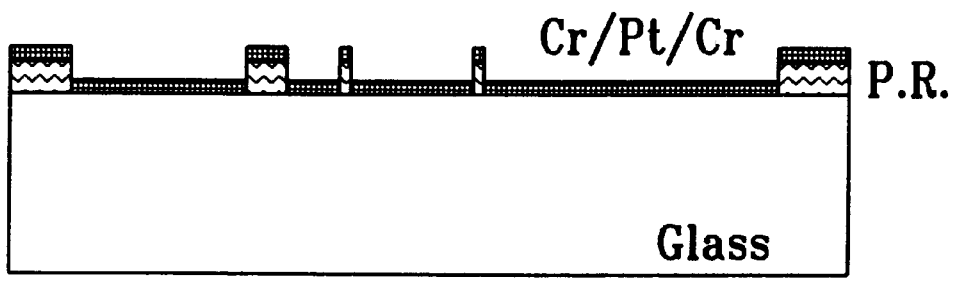
Figure 9:
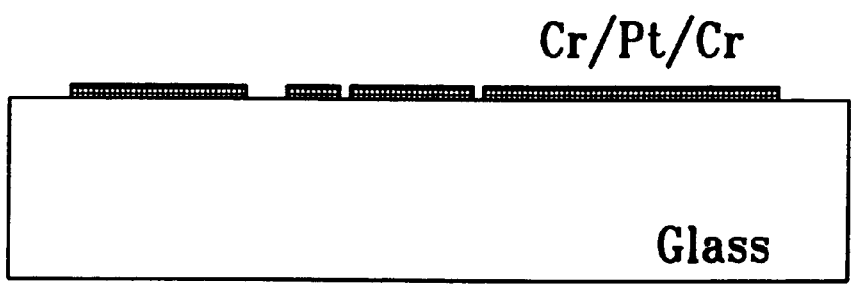
Figure 10:
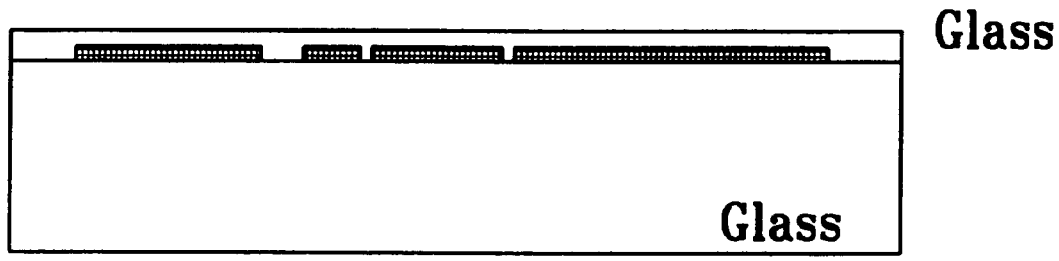
Figure 11:
Figure 12:
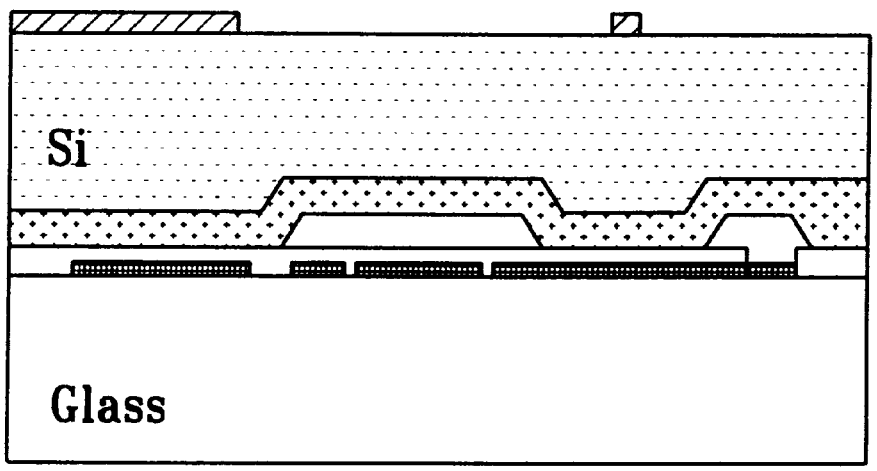
Figure 13:
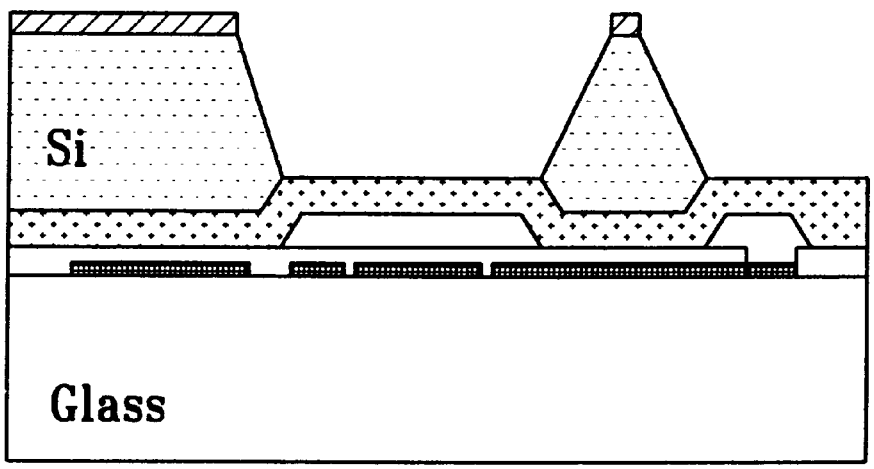
Figure 14:
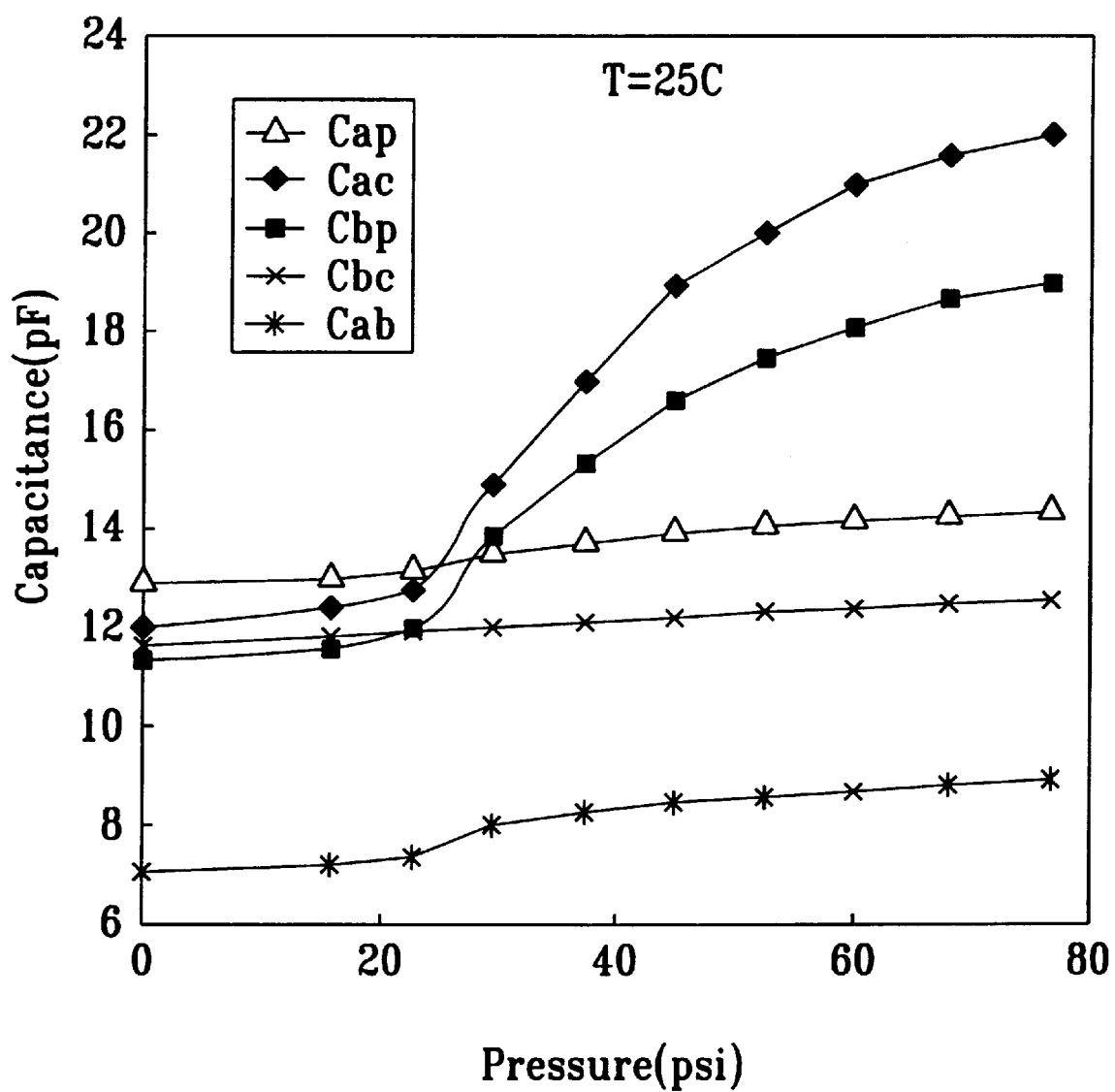

Drawing 2~13: Production Flow & Illustrative Chart

Drawing 14: Characteristic Curve Graph of Exterior Pressure & Capacitor Values of Structure & Its Producing of a Three-Electrode Capacitive Pressure Sensor Table 1: Environment Interference Testing Table

DETAILED DESCRIPTION OF THE PREFERRED EMBODIMENT

Please refer to Drawing 1. Drawing 1 shows structure drawing of its production and structure of the invention, a three electrode capacitive pressure sensor. In the drawing, p represents upper layer silicon electrode; a, b and c represent three metal film electrode on lower layer glass.

Square silicon film zone represents pressure-sensing cavity. According to documentation, the most sensitive zone of transformation of silicon film caused by pressure to change capacitor value occupies 60% to 70% of side length center of such film. Thus, 49% area of pressure sensing cavity center can be a sensing capacitor ($C_{ap}$), and the remaining area will be a reference capacitor ($C_{bp}$) by ring structure. So, dual capacitors can be placed in the single pressure-sensing cavity as differentiated measurement. However, these dual capacitors $C_{ap}$ and $C_{bp}$ are of upper and lower dimensional electrode connection. Planar connection of avoiding dimensional electrode connection can be done by increasing a third electrode plate in the periphery of pressure sensing cavity. $C_{pc}$ is composed by silicon electrode p and metal electrode c of larger area clipped with a film of glass electricity interface. Thus, $C_{pc}$ capacitor value is at least 20 times greater than that of $C_{ap}$ and $C_{bp}$. $C_{ac}$ is series-wound by a small capacitor $C_{ap}$ and a large capacitor $C_{pc}$ through silicon film electrode. Its capacitor value is similar to that of $C_{ap}$. Similarly, $C_{bc}$ is series-wound by a small capacitor $C_{bp}$ and a large capacitor $C_{pc}$ through a film electrode with a capacitor value approximate to that of $C_{bp}$. So, $C_{ac}$ and $C_{bc}$ are a dual capacitor structure with planar connection of original $C_{ap}$ and $C_{bp}$ capacitor value.

In planar connection of general capacitive pressure sensor, one electrode plate is divided into two parts and series-wound by capacitors through another electrode, i.e. please refer to Drawing that $C_{ab}$ is series-wound by $C_{ap}$ and $C_{bp}$ through silicon film electrode. Capacitor value of $C_{ab}$ is half of that of $C_{ap}$ or $C_{bp}$, and pressure sensitivity of $C_{ab}$ ($\Delta Cab/\Delta P$) is ¼ of $C_{ap}$ pressure sensitivity ($\Delta Cap/\Delta P$). $C_{ap} \approx C_{bp}$ and $\Delta C_{bp}/\Delta P \approx 0$ (reference capacitor $C_{bp}$ changes very little with pressure).

$$C_{ab}=C_{ap}C_{bp}/(C_{ap}+C_{bp})=\tfrac{1}{2}C_{ap}$$

$$\Delta C_{ab}/\Delta P = \frac{C_{ap}/\Delta P[C_{bp}(C_{ap}+C_{bp})-C_{ap}C_{bp}]}{(C_{ap}+C_{bp})^2} = \frac{1}{4}\Delta C_{ap}/\Delta P$$

Capacitor $C_{ac}$ is approximate to capacitor $C_{ap}$, making pressure sensitivity of $C_{ac}$ a 4 times of that of $C_{ab}$, i.e. pressure sensitivity of producing method and structure of a three electrode capacitive pressure sensor of planar connection is 4 times of that of capacitive pressure sensor of general planar connection.

(A) Silicon Chip Production Flow:

Step 1: Growing oxide layer of silicon dioxide (Drawing 2); creating masking layer.

Step 2: Yellow light photographing (Drawing 3); determining scope of pressure cavity.

Step 3: Potassium hydroxide engraving (Drawing 4); determining depth of pressure cavity.

Step 4: Boric diffusion (Drawing 5); determining thickness of silicon film.

Step 5: Yellow light photographing II (Drawing 6); determining scope of reverse side etching.

(B) Glass Chip Production Flow:

Step 6: Yellow light photographing M (Drawing 7); determining metal electrode mold.

Step 7: Metal splash plated with chromium/platinum/chromium (Drawing 8)

Step 8: Getting rid of optical resistance (Drawing 9); forming metal electrode

Step 9: Glass splash plated (Drawing 10); forming metal electrode insulation layer Step 10: Yellow light photographing IV (Drawing 11): determining exterior connection socket of metal electrode.

(C) Combination Production Flow:

Step 11: Anode combination (Drawing 12); combining silicon and glass chips.

Step 12: Etching of silicon reserve side (Drawing 13); forming silicon film.

The invention has following effects:

1. Pressure Sensitivity Testing:

Drawing 14 shows capacitor values of structure and producing method of a three-electrode capacitive pressure sensor illustrated in Drawing 1 together with characteristics curve of exterior pressure. The result of experiment confirms that three electrode capacitive structure design has consisted with its expected effects:

(a) $C_{ac}$ and $C_{bc}$ capacitor values are approximate to that of $C_{ap}$ and $C_{bp}$.

(b) Sensor capacitor $C_{ac}$ and $C_{ap}$ are more sensitive than that of reference capacitor $C_{bc}$ and $C_{bp}$ as pressure changes.

(c) Changes of sensor capacitor $C_{ac}$ of planar connection is consisted with sensor capacitor $C_{ap}$ of dimensional connection as pressure changes; i.e. the pressure sensor, designed by a three electrode capacitive structure, will not reduce pressure sensitivity of sensor.

(d) $C_{ab}$ is a planar connection of series-wound $C_{ap}$ and $C_{bp}$ (as described in previous technology). Pressure sensitivity (0.05 pF/psi) of $C_{ab}$ reduces to 25% of pressure sensitivity of $C_{ac}$ or $C_{ap}$ (0.21 pF/psi).

2. Environment Interference Testing

A differentiated measured capacitor/voltage converter achieves this test. Test result of Table 1 shows experimental result of changing environment temperature under a fixed exterior pressure condition. $V_{ab-c}$ represents voltage output value of differentiated measurement ($C_{ac}-C_{bc}$) of sensor capacitor $C_{ac}$ and reference capacitor $C_{bc}$, and $V_{ac}$ represents output voltage value of differentiated measurement of sensor capacitor $C_{ac}$ and a fixed exterior-added reference capacitor $C_O$.

TABLE 1

|  | $C_{ac}$ (pF) | $C_{bc}$ (pF) | $V_{ac}$ (V) | $V_{ab-c}$ (V) |
| --- | --- | --- | --- | --- |
| 25° C. | 11.444 | 11.662 | 1.396 | 1.353 |
| 60° C. | 11.505 | 11.825 | 1.425 | 1.350 |

The test result shows $C_{ac}$ and $C_{bc}$ will increase values as temperature raises up. Therefore, $V_{abc}$ differentiated measurement can cancel off environment change ($\Delta V_{ab-c}=3$ mV) of same mode through differentiation method. $V_{ac}$ measurement has different changes of capacitor values due to different location and material between $C_O$ and $C_{ac}$ as temperature changes. As a result, $V_{ac}$ measurement can not cancel off environment change ($\Delta V_{ac}=29$ mV) under different mode.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A structure of three-electrode capacitive pressure sensor, comprising dual electrode plates, that one of which is divided into a ring-shaped three electrode structure with its outer and middle layers electrodes wrapped separately at outward surrounding of inner layer electrode, and that the other one uses another electrode plate to form a dual capacitors through series-wound capacitor.

2. A three-electrode capacitive structure according to claim 1 wherein the three-electrode structures are on the same plane.

* * * * *